(12) United States Patent
Choi et al.

(10) Patent No.: US 11,791,484 B2
(45) Date of Patent: Oct. 17, 2023

(54) METHOD FOR DEALING WITH FAULT IN FUEL CELL SYSTEM

(71) Applicant: HYUNDAI MOBIS Co., Ltd., Seoul (KR)

(72) Inventors: Sung Kyung Choi, Yongin-si (KR); Jong Bo Won, Yongin-si (KR)

(73) Assignee: HYUNDAI MOBIS CO., LTD., Seoul (KR)

( * ) Notice: Subject to any disclaimer, the term of this patent is extended or adjusted under 35 U.S.C. 154(b) by 23 days.

(21) Appl. No.: 17/536,692

(22) Filed: Nov. 29, 2021

(65) Prior Publication Data
US 2023/0008445 A1 Jan. 12, 2023

(30) Foreign Application Priority Data
Jul. 7, 2021 (KR) .................. 10-2021-0089371

(51) Int. Cl.
| | | |
|---|---|---|
| *H01M 8/00* | (2016.01) | |
| *H01M 8/0438* | (2016.01) | |
| *H01M 8/04007* | (2016.01) | |
| *H01M 8/04664* | (2016.01) | |
| *H01M 8/04746* | (2016.01) | |

(52) U.S. Cl.
CPC ... *H01M 8/04417* (2013.01); *H01M 8/04074* (2013.01); *H01M 8/04679* (2013.01); *H01M 8/04768* (2013.01)

(58) Field of Classification Search
CPC ......... H01M 8/04701; H01M 8/04992; H01M 8/04007; H01M 8/04029; H01M 2250/20; Y02E 60/50
See application file for complete search history.

(56) References Cited

U.S. PATENT DOCUMENTS

2019/0181476 A1 6/2019 Jeong

FOREIGN PATENT DOCUMENTS

| CN | 110993987 A | * | 4/2020 | ........ H01M 8/04007 |
|---|---|---|---|---|
| KR | 10-1284343 B1 | | 7/2013 | |

OTHER PUBLICATIONS

Gong et al., Fuel Battery Automobile Cooling System And Control Method Thereof, Apr. 2020, See the Abstract. (Year: 2020).*
Extended European Search Report issued in corresponding European Patent Application No. 21210917.7 dated May 18, 2022.

* cited by examiner

*Primary Examiner* — Cynthia H Kelly
*Assistant Examiner* — Monique M Wills
(74) *Attorney, Agent, or Firm* — MORGAN, LEWIS & BOCKIUS LLP (57) ABSTRACT

A method for operating a fuel cell system having a fuel cell stack includes detecting a failure of a first cooling fan that blows exterior air to a first radiator, opening a first valve such that first cooling water that passes via the fuel cell stack flows toward the fuel cell stack, controlling an RPM of a blower of an air conditioning system to a maximum level, controlling an opening degree of a second valve according to a cooling degree of the first radiator and a cooling degree of the air conditioning system, and controlling an RPM of a first pump that pumps the first cooling water to a maximum level.

10 Claims, 12 Drawing Sheets

METHOD FOR DEALING WITH FAULT IN FUEL CELL SYSTEM

CROSS-REFERENCE TO RELATED APPLICATION

This application claims the benefit of priority to Korean Patent Application No. 10-2021-0089371, filed in the Korean Intellectual Property Office on Jul. 7, 2021, the entire contents of which are incorporated herein by reference.

TECHNICAL FIELD

The present disclosure relates to a technology for dealing with a fault in a fuel cell system.

BACKGROUND

A fuel cell system may generate electric energy by using a fuel cell stack. For example, when hydrogen is used as a fuel of the fuel cell stack, it may be a measure of solving global environmental problems, and thus researches and developments on fuel cell systems have been continuously made. A fuel cell system may include a fuel cell stack that generates electrical energy, a fuel supply device that supplies a fuel (hydrogen) to the fuel cell stack, an air supply device that supplies oxygen in air, which is an oxidizer that is necessary for an electric chemical reaction, to the fuel cell stack, and a thermal management system (TMS) that removes reaction heat of the fuel cell stack to the outside, controls an operation temperature of the fuel cell stack, and performs a water management function.

The thermal management system is a kind of a cooling device that circulates an anti-freezing liquid that functions as cooling water in a fuel cell system and maintain the fuel cell stack at a proper temperature (for example, 60 to 70° C.), and may include a TMS line, in which the cooling water circulates, a reservoir in which the cooling water is stored, a pump that circulates the cooling water, and an ion filter that removes ions included in the cooling water, and a radiator that discharges the heat of the cooling water to the outside. Furthermore, the thermal management system may include a heater that heats the cooling water, and an air conditioning system (for example, a heater for heating) that cools and heats an interior of a device (e.g., a vehicle) including the fuel cell system by using the cooling water. The thermal management system may maintain a proper temperature of a power electronic component of the vehicle as well as the fuel cell stack.

SUMMARY

The present disclosure has been made to solve the above-mentioned problems occurring in the prior art while advantages achieved by the prior art are maintained intact.

To smoothly manage heat of a fuel cell system, a temperature of cooling water that passes via a fuel cell stack has to be adjusted to a desired temperature, and to achieve this, a radiator has to dissipate heat generated in the fuel cell stack to the air. Accordingly, design of a radiator, a cooling fan, and a pump is considered as an important element in a fuel cell system. For example, when the cooling fan is disabled, the fuel cell stack is overheated.

Although a specific vehicle (e.g., a construction machine such a forklift truck) may shut off an operation of a fuel cell stack to protect the fuel cell stack of a high price when the fuel cell stack is overheated due to a failure of a component, such as a cooling fan, it is necessary to secure a cooling degree of the fuel cell system for a specific period of time even in a state, in which a fault occurs in a component, because an operation of the fuel cell stack may be necessary for a specific period of time for an emergency measure such as evacuation of the vehicle to a safe site.

The technical problems to be solved by the present inventive concept are not limited to the aforementioned problems, and any other technical problems not mentioned herein will be clearly understood from the following description by those skilled in the art to which the present disclosure pertains.

According to an aspect of the present disclosure, a fuel cell system includes a fuel cell stack, a first cooling line having first cooling water that passes via the fuel cell stack and circulates therein, a first radiator disposed on the first cooling line and that cools the first cooling water, an air conditioning system disposed on a first connection line that forms a heating loop with the first cooling line, a first cooling fan that blows exterior air to the first radiator, a first valve that switches a flow path of the first cooling water to the fuel cell stack or a heater, a second valve that switches the flow path of the first cooling water to the fuel cell stack or the first radiator, a first pump disposed on the first cooling line and that pumps the first cooling water, and a controller connected to the first cooling fan, the first valve, the second valve, and the first pump, and the controller is configured to detect a failure of the first cooling fan, open the first valve such that the first cooling water flows toward the fuel cell stack, control an RPM of a blower of the air conditioning system to a maximum level, control an opening degree of the second valve according to a cooling degree of the first radiator and a cooling degree of the air conditioning system, and control an RPM of the first pump to a maximum level.

According to an aspect of the present disclosure, a method for operating a fuel cell system having a fuel cell stack includes detecting a failure of a first cooling fan that blows exterior air to a first radiator, opening a first valve such that first cooling water that passes via the fuel cell stack flows toward the fuel cell stack, controlling an RPM of a blower of an air conditioning system to a maximum level, controlling an opening degree of a second valve according to a cooling degree of the first radiator and a cooling degree of the air conditioning system, and controlling an RPM of a first pump that pumps the first cooling water to a maximum level.

BRIEF DESCRIPTION OF THE DRAWINGS

The above and other objects, features and advantages of the present disclosure will be more apparent from the following detailed description taken in conjunction with the accompanying drawings.

With regard to description of drawings, the same or similar components may be marked by the same or similar reference numerals.

DETAILED DESCRIPTION

Hereinafter, various embodiments of the present disclosure will be described with reference to the accompanying drawings. Accordingly, those of ordinary skill in the art will recognize that modifications, equivalents, and/or alternatives on the various embodiments described herein can be variously made without departing from the scope and spirit of the present disclosure.

Various embodiments of the present disclosure and the terms used herein do not limit the technical features described in the present disclosure to specific embodiments, and should be construed to include various modifications, equivalents, or replacements of the embodiments. With regard to the description of drawings, similar components may be denoted by similar reference numerals. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include all possible combinations of the items enumerated together in a corresponding one of the phrases. As used herein, such terms as "1st" and "2nd" or "first" and "second" may be used to simply distinguish a corresponding component from another, and does not limit the components in other aspects (e.g., an importance or an order). It is to be understood that if an element (e.g., a first element) is referred to, with or without the term "operatively" or "communicatively", as "coupled with" or "connected with", it means that the element may be coupled with the other element directly (e.g., by wire), wirelessly, or via a third element.

The term "module" used in various embodiments of the present disclosure may include a unit configured in a hardware, software, or firmware way, and for example, may be used interchangeably with the terms such as logic, a logic block, a component, or a circuit. The module may be an integral component, or a minimum unit or a part which performs one or more functions.

For example, according to an embodiment, the module may be implemented in a form of an application-specific integrated circuit (ASIC).

Various embodiments of the present disclosure may be implemented by software (e.g., a program) including one or more instructions stored in a storage medium (e.g., an internal memory or an external memory) that may be read by a machine. For example, a device may call, among one or more instructions stored in a storage medium, at least one instruction, and may execute the instruction. This allows at least one function to be performed according to the called at least one instruction. The one or more instructions may include a code that is made by a compiler or a code that may be executed by an interpreter. The storage medium that may be read by a device may be provided in a form of a non-transitory storage medium. Here, the 'non-transitory storage medium' means that the storage medium is a tangible device and does not include a signal (e.g., an electromagnetic wave), and with regard to the term, a case, in which data are semi-permanently stored in the storage medium, and a case, in which data are temporarily stored in the storage medium, are not distinguished.

According to an embodiment, the methods according to various embodiments of the present disclosure may be provided to be included in a computer program product. The computer program product may be traded between a seller and a purchaser. The computer program product may be distributed in a form of a storage medium that may be read by a device (e.g., a compact disk read only memory (CD-ROM) or may be distributed (e.g., downloaded or uploaded) through an application store or directly or online between two user devices. In the online distribution, at least a portion of the computer program product may be at least temporarily stored in a storage medium, such as a server of a manufacturer, a server of an application store, or a memory of a relay server, which may be read by a device, or temporarily generated.

According to various embodiments, elements (e.g., modules or programs) of the above-described elements may include one or a plurality of entities, and some of the plurality of entities may be disposed to be separated from the other elements. According to various embodiments, among the above-described elements, one or more elements or operations may be omitted or one or more other elements or operations may be added. Alternatively or additionally, the plurality of elements (e.g., modules or programs) may be integrated into one element. In this case, the integrated elements may perform one or more functions of the elements of the plurality of elements in a way that is the same as or similar to the functions performed by the corresponding elements of the plurality of elements before the integration. According to various embodiments, the operations performed by modules, programs, or other elements may be executed sequentially, in parallel, repeatedly, or heuristically, one or more operations may be executed in another sequence or omitted, or one or more other operations may be added.

Figure 1:
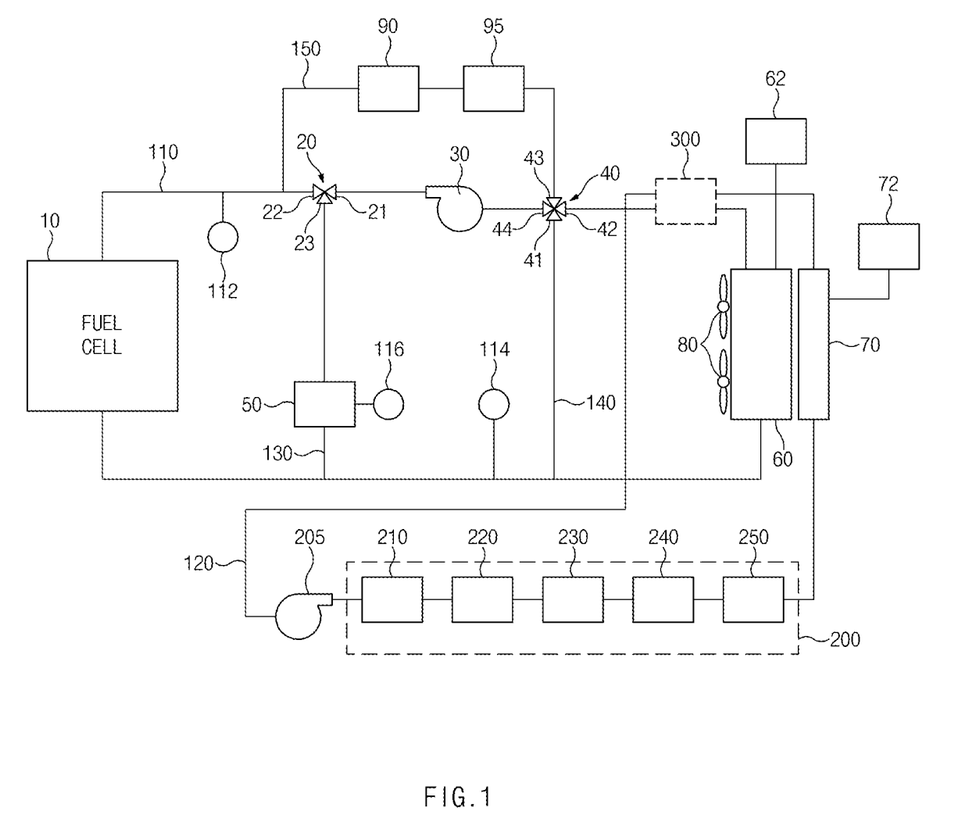
FIG. 1 illustrates a fuel cell system according to various embodiments.
Figure 4:
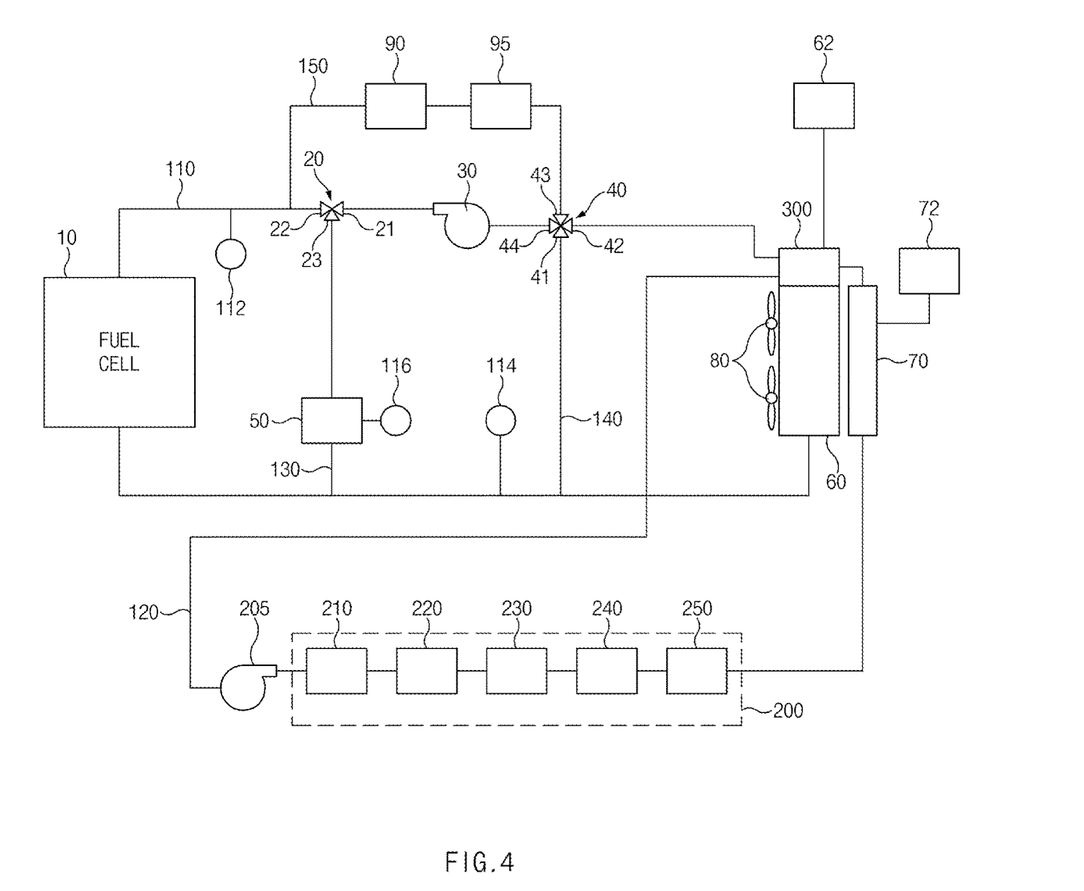
FIG. 4 illustrates a fuel cell system according to various embodiments.

FIGS. 1 and 4 illustrate a fuel cell system according to various embodiments.

Referring to FIG. 1, a fuel cell system for a vehicle may include a first cooling line 110, in which first cooling water that passes via a fuel cell stack 10 of the vehicle circulates, and a second cooling line, in which second cooling water that passes via power electronic parts of the vehicle circulates. In the embodiment, the fuel cell system may further include a heat exchanger 300 that exchanges heat between the first cooling water and the second cooling water, but the heat exchanger 300 may be omitted.

Figure 2A:
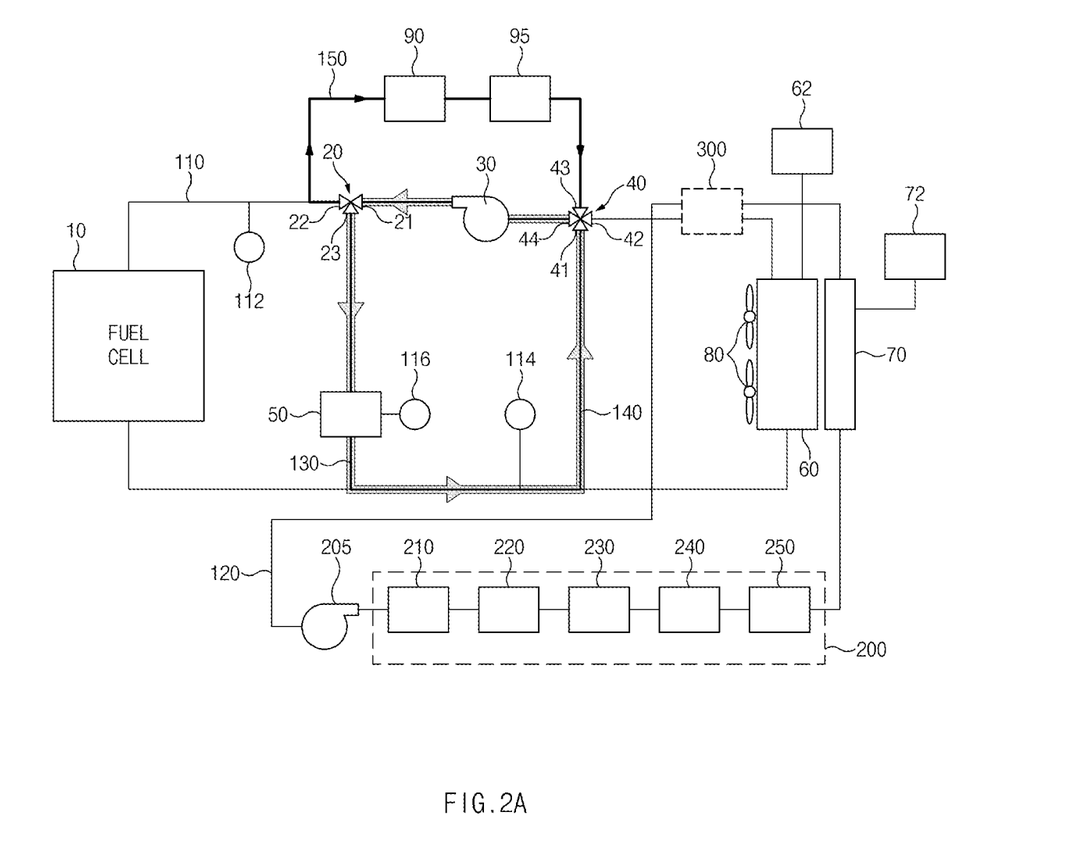
FIGS. 2A and 2B illustrate a fuel cell system, in which first cooling water flows, according to various embodiments.
Figure 2B:
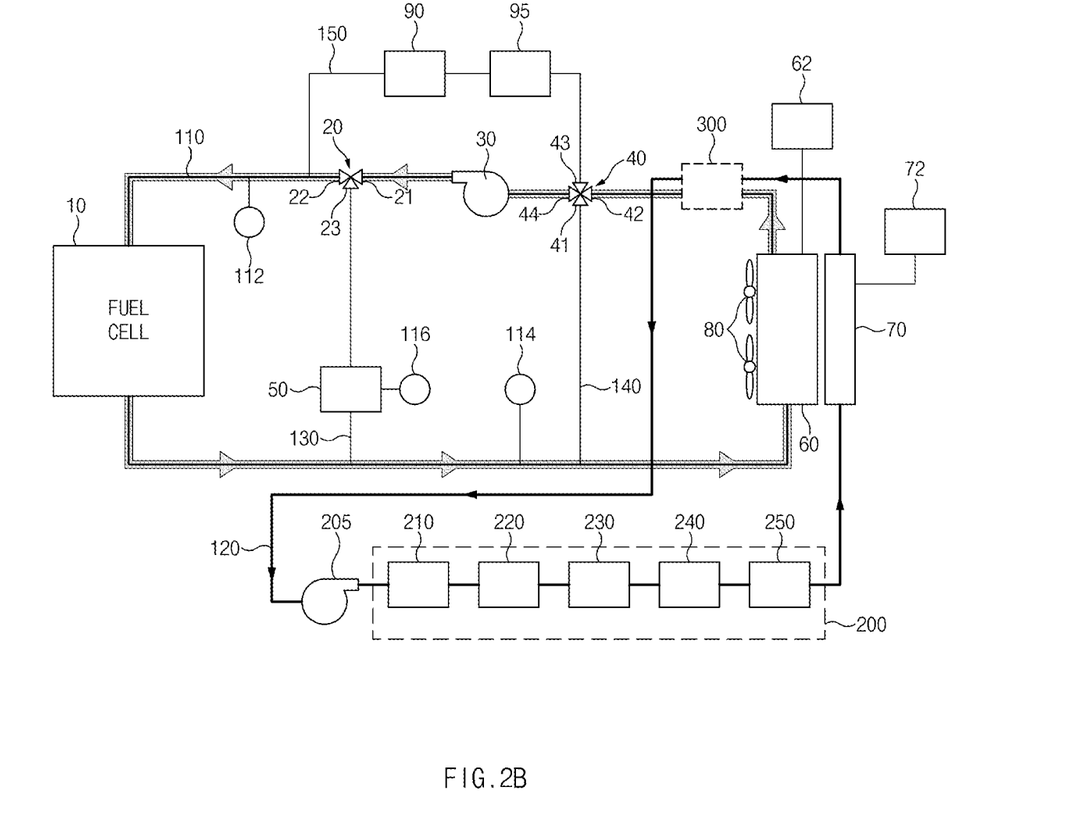

The fuel cell system may include a first connection line 130, a second connection line 150, and a third connection line 140 to form a heating loop (a heating circulation path) with the first cooling line 110 or form a cooling line with the first cooling line 110. The first cooling water may be cooled or heated while circulating in the first connection line 130, the second connection line 150, or the third connection line 140. As an example, the first cooling line 110, as illustrated in FIG. 2A, may form a heating loop with the first connection line 130 and the third connection line 140 to secure a cold start capacity in an initial start condition of the vehicle, and, as illustrated in FIG. 2B, may form a cooling loop, in which the first cooling water passes through a first radiator 60 such that heat generated by the fuel cell stack 10 is emitted to the outside while driving of the vehicle. In another embodiment, when a temperature of exterior air is as high as a specific temperature, the first cooling line 110 does not form a heating loop and the fuel cell system may secure a start capacity through heat of the fuel cell stack 10. The fuel cell stack 10, a first valve 20, a first pump 30, a second valve 40, and the first radiator 60 may be disposed on the first cooling line 110, in which the first cooling water circulates.

The fuel cell stack 10 (or may be referred to as a 'fuel cell') may have a structure, in which electricity may be produced through an oxidation/reduction reaction of a fuel (for example, hydrogen) and an oxidizer (for example, air). As an example, the fuel cell stack 10 may include a membrane electrode assembly (MEA), in which catalyst electrode layers for an electric chemical reaction are attached to opposite sides of a membrane with respect to an electrolyte membrane, through which hydrogen ions travel, a gas diffusion layer (GDL) that uniformly distributes reaction gases and delivers generated electrical energy, a gasket and a coupling mechanism for maintaining a tightness and a proper coupling pressure of the reaction gases and the first cooling water, and a bipolar plate that causes the reaction gases and the first cooling water to flow.

In the fuel cell stack 10, the hydrogen that is the fuel and the air (oxygen) that is the oxidizer are supplied to an anode and a cathode of the membrane electrode assembly, and the hydrogen may be supplied to the anode and the air may be supplied to the cathode. The hydrogen supplied to the anode is decomposed into protons and electrons by a catalyst of the electrode layers provided on opposite sides of the electrolyte membrane, and among them, only the hydrogen ions may be delivered to the cathode after selectively passing through the electrolyte membrane that is a cation exchange membrane, and the electrons may be delivered to the cathode through the gas diffusion layer and the bipolar plate. In the cathode, the hydrogen ions supplied through the electrolyte membrane and the electrons delivered through the bipolar plate may meet oxygen in the air supplied to the cathode by an air supply device and may generate a reaction of generating water. Then, the electrons may flow through an external wire due to the flows of the hydrogen ions, and electric currents may be generated due to the flows of the electrons.

The first valve 20 may switch a flow path of the first cooling water to the first connection line 130, in which a heater is disposed, or the fuel cell stack 10 on the first cooling line 110. For example, the first valve 20 may be connected to one end of the first pump 30, one end of the first connection line 130, and one end of the fuel cell stack 10 on a first cooling line 20. The first valve 20 may include various valve means that may selectively switch the flow path of the first cooling water. As an example, the first valve 20 may be a 3-way valve. In this case, the first valve 20 may include a first port 21 connected to the first cooling line 110 such that the first cooling water pumped by a first pump 30 is introduced therethrough, a second port 22 connected to the first cooling line 110 such that the first cooling water that passes through the first valve 20 is introduced into the fuel cell stack 10, and a third port 23 connected to one end of the first connection line 130. As the second port 22 and the third port 23 of the first valve 20 are opened and closed, the flow path of the first cooling water may be switched to a heater 50 of the first connection line 130 or the fuel cell stack 10. That is, when the second port 22 is opened and the third port 23 is closed, the first cooling water may be introduced into the fuel cell stack 10, and to the contrary, when the third port 23 is opened and the second port 22 is closed, the first cooling water may be introduced into the heater 50 through the first connection line 130.

The first connection line 130 may form a heating loop (a heating circulation path) with the first cooling line 110 to heat the first cooling water. For example, the first cooling water that flows along the first connection line 130 may be heated while passing through the heater 50 installed in the first connection line 130. One end of the first connection line 130 may be connected to the first cooling line 110 at a first point located between an outlet of the first pump 30 and the fuel cell stack 10, and another end of the first connection line 130 may be connected to the first cooling line 110 at a second point located between an inlet of the first pump 30 and the fuel cell stack 10. Here, the inlet of the first pump 30 may be defined as an inlet, through which the first cooling water is introduced into the first pump 30. Furthermore, the outlet of the first pump 30 may be defined as an outlet, through which the first cooling water that passed through the first pump 30 is discharged. Furthermore, a section between the outlet of the first pump 30 and the fuel cell stack 10 may be defined as a section, in which the first cooling water discharged from the first pump 30 flows to a first cooling water inlet (not illustrated) of the fuel cell stack 10. Furthermore, a section between the inlet of the first pump 30 and the fuel cell stack 10 may be defined as a section, in which the first cooling water discharged from a cooling water outlet (not illustrated) of the fuel cell stack 10 flows to the inlet of the first pump 30.

The first pump 30 may be configured to cause the first cooling water to compulsorily flow. The first pump 30 may include various means that may pump the first cooling water, and the kinds and the number of the first pumps 30 are not limited in the present disclosure.

The second valve 40 may switch the flow path of the first cooling water to the first radiator 60 or the fuel cell stack 10 on the first cooling line 110. For example, the second valve 40 may be provided on the first cooling line 110 to be located between the first pump 30 and the first radiator 60, and may be connected to one end of the third connection line 140 and the outlet of the first radiator 60. The second valve 40 may include various valve means that may selectively switch the flow path of the first cooling water to the first radiator 60 or the fuel cell stack 10. As an example, the second valve 40 may be a 4-way valve or a 3-way valve. When the second valve 40 is a 3-way valve, it may include a first port 41 connected to the third connection line 140, a second port 42 connected to the first cooling line 110 such that the first cooling water that passes through the first radiator 60 is introduced therethrough, and a third port 44 connected to the first cooling line 110 such that the first cooling water is introduced into the first pump 30, and when the second valve 40 is a 4-way valve, it may further include a third port 43 connected to one end of the second connection line 150. As the first port 41 or the second port 42 of the second valve 40 is opened and closed, the flow path of the first cooling water may be switched to the first radiator 60 or the fuel cell stack 10. That is, when the first port 41 is opened and the second port 42 is closed, the first cooling water is introduced into the fuel cell stack 10 while not passing through the first radiator 60, and to the contrary, when the second port 42 is opened and the first port 41 is closed, the first cooling water may be introduced into the fuel cell stack 10 after passing through the first radiator 60.

The second connection line 150 may form a heating loop with the first cooling line 110 to heat an air conditioning system (an HVAC system) 90. As an example, the second connection line 150 may form a loop that heats a heater (not illustrated) for heating an air conditioning system 90. One end of the second connection line 150 may be connected to the first cooling line 110 between the first point (the point, at which one end of the first connection line 130 is connected to the first cooling line 110) and the inlet of the fuel cell stack 10, and a portion of the first cooling water may circulate through the second connection line 150. Another end of the second connection line 150 may be connected to the first cooling line 110 between the first pump 30 and the second point (the point, at which another end of the first connection line 130 is connected to the first cooling line 110).

An ion filter 95 that filters ions of the first cooling water that has passed through the air conditioning system 90 may be provided in the second connection line 150. Because electric currents flow the first cooling water so that the fuel cell stack 10 is short-circuited or electric currents flow toward the first cooling water when an electrical conductivity of the first cooling water increases due to corrosion or exudation of the system, the first cooling water has to maintain a low electrical conductivity. The ion filter 95 may be configured to remove ions included in the first cooling water to maintain the electrical conductivity of the first cooling water at a specific level or less. In this way, during a cold start, in which the supply of the first cooling water flowing to the fuel cell stack 10 is interrupted (the second port 22 of the first valve 20 is closed), the first cooling water circulates (a temperature rising loop) via the heater 50 of the first connection line 130 and also circulates along the second connection line 150, whereby filtering (removal of ions included in the first cooling water) may be made possible by the ion filter 95 provided in the second connection line 150 during the cold start. Accordingly, the electrical conductivity of the first cooling water introduced into the fuel cell stack 10 immediately after the cold start may be advantageously maintained at the specific level or less.

The third connection line 140 may form a cooling loop with the first cooling line 110 to cool the first cooling water. As an example, one end of the third connection line 140 may be connected to the first cooling line 110 between the first pump 30 and the first radiator 60, and another end of the third connection line 140 may be connected to the first cooling line 110 between the cooling water outlet of the fuel cell stack 10 and the first radiator 60.

The first radiator 60 may be configured to cool the first cooling water. The first radiator 60 may have various structures that may cool the first cooling water, and the kinds and structures of the first radiator 60 are not limited or restricted in the present disclosure. The first radiator 60 may be connected to a first reservoir 62, in which the first cooling water is stored.

The fuel cell system may include a first temperature sensor 112 that measures a temperature of the first cooling water between the fuel cell stack 10 and the first point (the first valve 20), a second temperature sensor 114 that measures a temperature of the first cooling water between another end of the first connection line 130 and the first pump 30, and a third temperature sensor 116 that measures a temperature of the cooling water in the heater 50. The fuel cell system may control a flow rate of the first cooling water introduced into the fuel cell stack 10 based on the temperatures measured by the first temperature sensor 112, the second temperature sensor 114, and the third temperature sensor 116. As an example, when the measured temperature of the first cooling water that circulates along the first cooling line 110 is lower than a preset target temperature, the flow rate of the introduced first cooling water may be controlled to be lower than a preset flow rate. In this way, because the flow rate of the first cooling water introduced into the fuel cell stack 10 is controlled to be low when the measured temperature of the first cooling water is low, a thermal impact or deterioration of performance due to a deviation between the temperature of the first cooling water staying in the interior of the fuel cell stack 10 and the temperature of the first cooling water introduced into the fuel cell stack 10 may be advantageously minimized.

A second cooling line 120 passes via power electronic parts 200, and the second cooling water may circulate along the second cooling line 120. Here, the power electronic parts 200 of the vehicle may be understood as components that use a power source of the vehicle as an energy source, and the kinds and the number of the power electronic parts 200 are neither limited nor restricted in the present disclosure. As an example, the power electronic parts 200 may include at least any one of a bi-directional high voltage DC-DC converter (BHDC) 210 provided between the fuel cell stack 10 and a high-voltage battery (not illustrated) of the vehicle, a blower pump controller (BPCU) 220 that controls a blower (not illustrated) that supplies exterior air for driving the fuel cell stack 10, a low-voltage DC-DC converter 230 that converts a DC high-voltage received from a high-voltage battery into a DC lower-voltage, an air compressor (ACP) 240 that compresses the air supplied to the fuel cell stack 10, and an air cooler 250. Although not illustrated in FIGS. 1 and 4, the power electronic parts 200 may further include a DC-DC buck/boost converter.

A second pump 205 for causing the second cooling water to compulsorily flow may be disposed on the second cooling line 120. The second pump 205 may include a pumping means that may pump the second cooling water, and the kinds and the characteristics of the second pump 205 are neither limited nor restricted.

A second radiator 70 for cooling the second cooling water may be disposed on the second cooling line 120. The second radiator 70 may have various structures that may cool the second cooling water, and the kinds and structures of the second radiator 70 are neither limited nor restricted. The second radiator 70 may be connected to a second reservoir 72, in which the first cooling water is stored.

In the embodiment, the first radiator 60 and the second radiator 70, as illustrated in FIG. 1, may be cooled by one cooling fan 80 at the same time. As an example, the first radiator 60 and the second radiator 70 may be disposed in parallel, and the cooling fan 80 may be configured to flow the exterior air to the first radiator 60 and the second radiator 70. Because the first radiator 60 and the second radiator 70 are cooled by the one cooling fan 80 at the same time, the structure of the fuel cell system may be simplified and a degree of freedom of design and a space utility may be improved, and power consumption for cooling the first radiator 60 and the second radiator 70 may be minimized.

Figure 3:
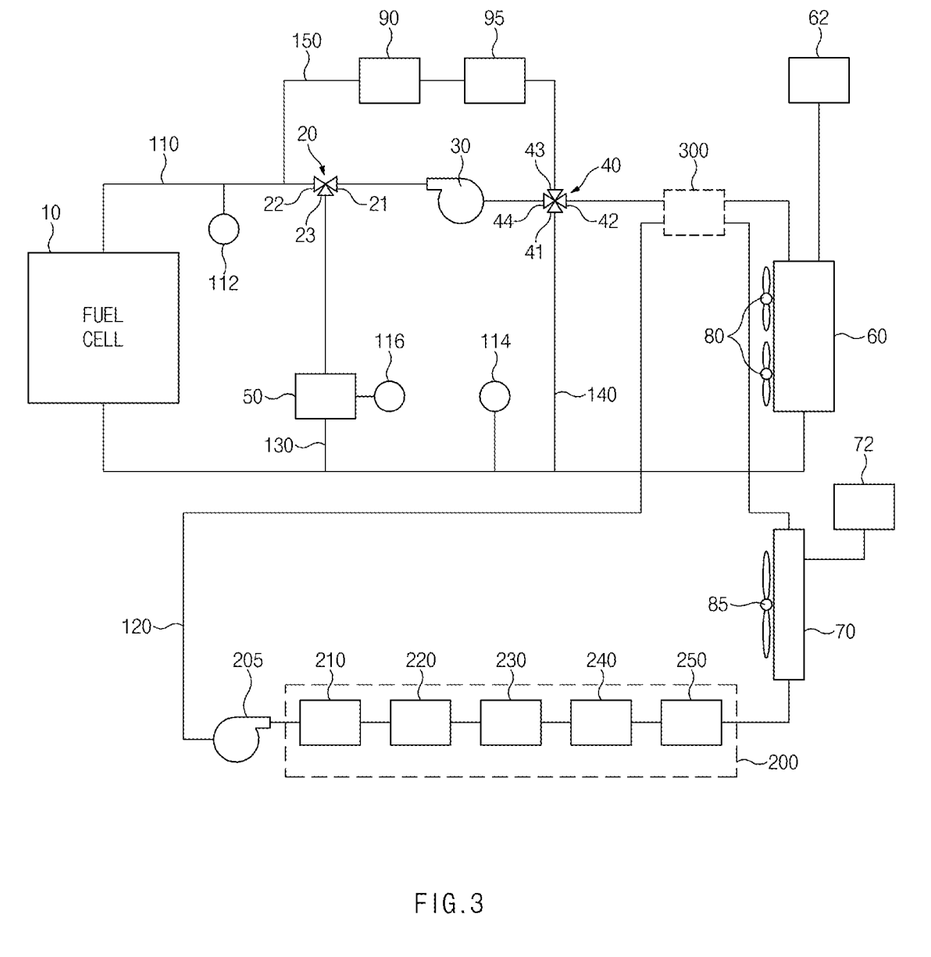
FIG. 3 illustrates a fuel cell system according to various embodiments.

In an embodiment, as illustrated in FIG. 3, a first cooling fan 80 for cooling the first radiator 60 and a second cooling fan 85 for cooling the second radiator 70 may be disposed separately. In this case, the fuel cell system may exclude a parameter related to thermal loads of the power electronic parts 200 when an RPM of the first cooling fan 80 is controlled. The embodiments described hereafter are based on the structure of the fuel cell system of FIG. 1, but the same principle may be applied to the structure of the fuel cell system of FIG. 3.

Referring to FIG. 1 again, the heat exchanger 300 may be configured to exchange heat between the first cooling water and the second cooling water. When a heat exchanger 300 is included, the first cooling line 110 and the second cooling line 120 may constitute a thermal management system (TMS) line, in which the first cooling water and the second cooling water may flow while exchanging heat, and in this case, the first cooling water or the second cooling water may be used as a cooling medium or a heat medium on the TMS line. For example, because the temperature of the second cooling water that cools the power electronic part is lower than the temperature of the first cooling water that cools the fuel cell stack 10, advantageously, the fuel cell system may lower the temperature of the first cooling water without increasing the capacities of the first radiator 60 and the cooling fan 80 by exchanging heat between the first cooling water and the second cooling water, a cooling efficiency of the fuel cell stack 10 may be improved, and safety and reliability may be improved. Furthermore, because the fuel cell system may lower the temperature of the first cooling water while the vehicle (example, a construction machine) that cannot use driving wind is stopped, advantageously, high-output driving of the fuel cell stack 10 may be secured, and safety and durability may be improved.

In the embodiment, the heat exchanger 300 may be connected to the first cooling line 110 between the outlet of the first radiator 60 and the fuel cell stack 10, and the second cooling line 120 may connect the outlet of the second radiator 70 and the power electronic parts such that the first cooling water passes via the heat exchanger 300. For example, the first cooling water may flow along the heat exchanger 300 connected to the first cooling line 110, and the second cooling line 120 may pass through an interior of the heat exchanger 300 to be exposed to the first cooling water (for example, the first cooling water flows along a circumference of the second cooling line 120). In this way, the fuel cell system may lower the temperature of the first cooling water introduced into the fuel cell stack 10 through exchange of heat between the first cooling water and the second cooling water. The first temperature of the first cooling water that passed through the first radiator 60 may be higher than the second temperature of the second cooling water that passed through the second radiator 70, and the third temperature of the first cooling water that passed through the heat exchanger 300 may be lower than the first temperature. As an example, the first temperature of the first cooling water may be higher than the second temperature of the second cooling water by about 10° C., and the third temperature of the first cooling water that passed through the heat exchanger 300 (exchanged heat with the second cooling water) may be lower than the first temperature by 1° C.

The heat exchanger 300 according to FIGS. 1 to 3 is disposed separately from the first radiator 60, but in another embodiment, as illustrated in FIG. 4, the heat exchanger 300 may be directly connected to the first radiator 60. For example, the heat exchanger 300 may be connected to a specific location (a left upper end portion) of the first radiator 60, but the present disclosure is not limited thereto. When the heat exchanger 300 is connected to a left upper end of the first radiator 60, the first radiator 60 and the heat exchanger 300 may be implemented as illustrated in FIGS. 5A and 5B.

Figure 5A:
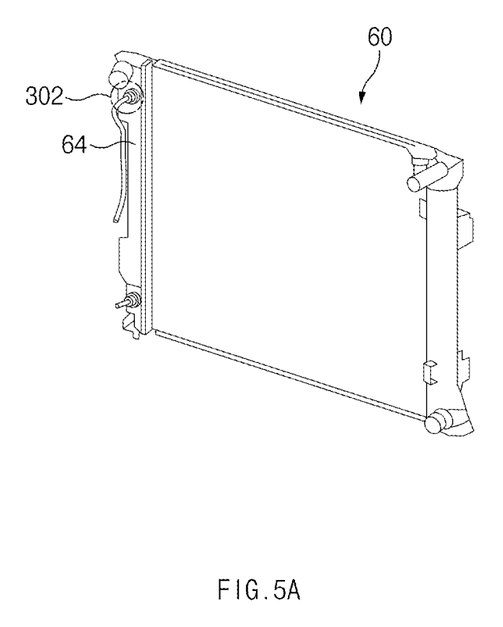
FIGS. 5A and 5B illustrate a first pipeline and a second pipeline according to various embodiments.
Figure 5B:
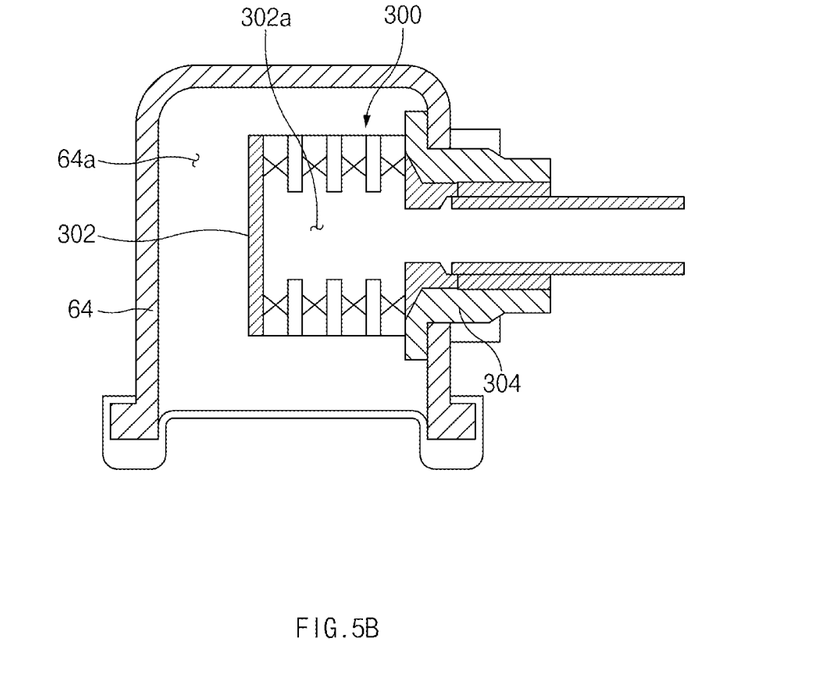

FIGS. 5A and 5B illustrate a first pipeline and a second pipeline according to various embodiments.

Referring to FIGS. 5A and 5B, the first radiator 60 may include a first pipeline 64 that forms a first passage 64a, in which the first cooling water flows, the heat exchanger 300 may include a second pipeline 302 configured to exchange heat with the first cooling water in an interior of the first passage 64a, and the second cooling water may exchange heat with the first cooling water in the first passage 64a while flowing along the second pipeline 302. The second pipeline 302 may form a second passage 302a, in which the second cooling water flows, and at least a portion of the second pipeline 302 may be exposed to the first cooling water in an interior of the first passage 64a. A shape and a structure of the second pipeline 302 may be variously changed according to a condition and a design specification that are required, and the present disclosure is neither limited nor restricted by the shape and the structure of the second pipeline 302. According to the embodiment, it is possible to form heat dissipating fins for increasing a contact area of an outer surface of the second pipeline, which is exposed to the first cooling water, on the outer surface of the second pipeline, to increase a cooling effect of the first cooling water. According to the embodiment, a sealing member 304 (for example, a rubber or silicon material) may be provided between the first pipeline 64 and the second pipeline 302. In this way, by providing the sealing member 304 between the first pipeline 64 and the second pipeline 302, a seated state of the first passage 64a may be advantageously stably maintained.

Figure 6:
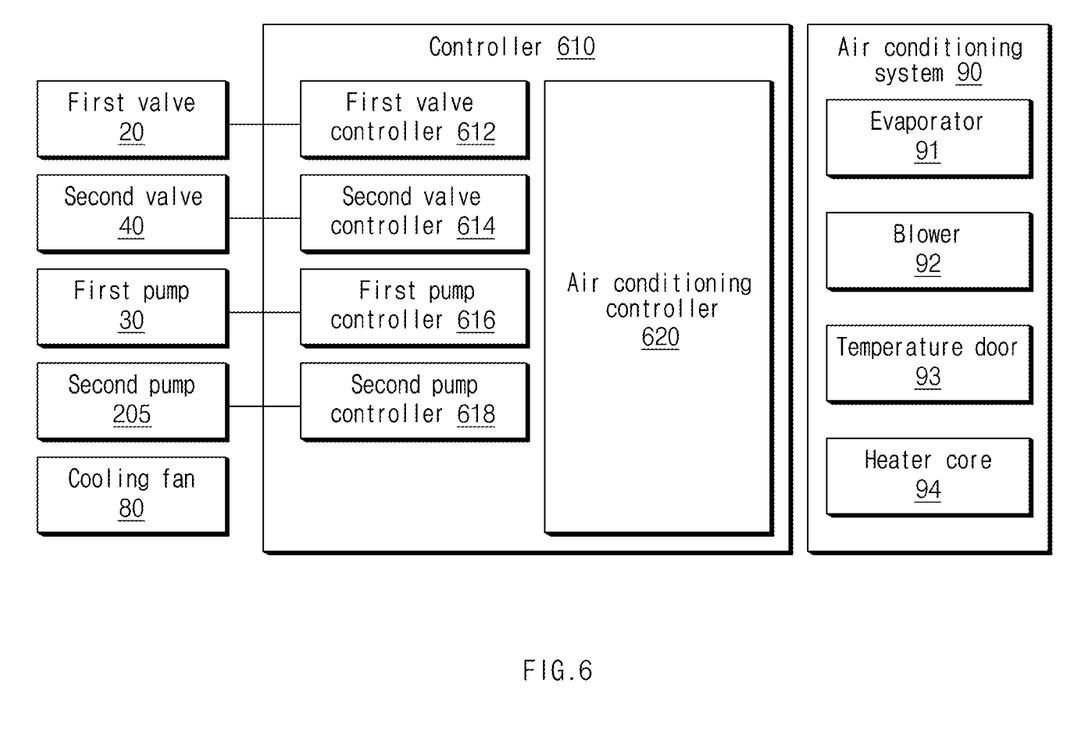
FIG. 6 is a functional block diagram of a fuel cell system according to various embodiments.
Figure 7:
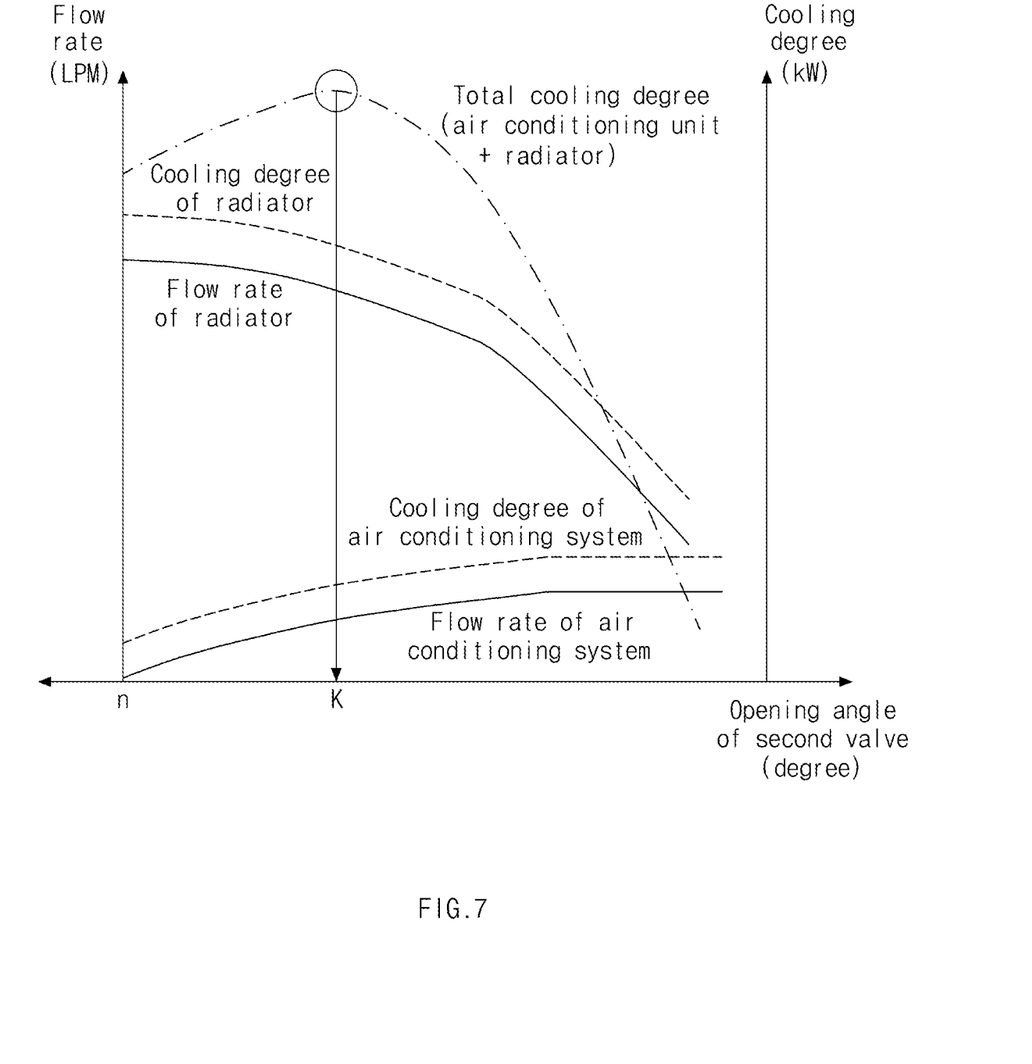
FIG. 7 illustrates a cooling degree according to an opening degree of a second valve.
Figure 8:
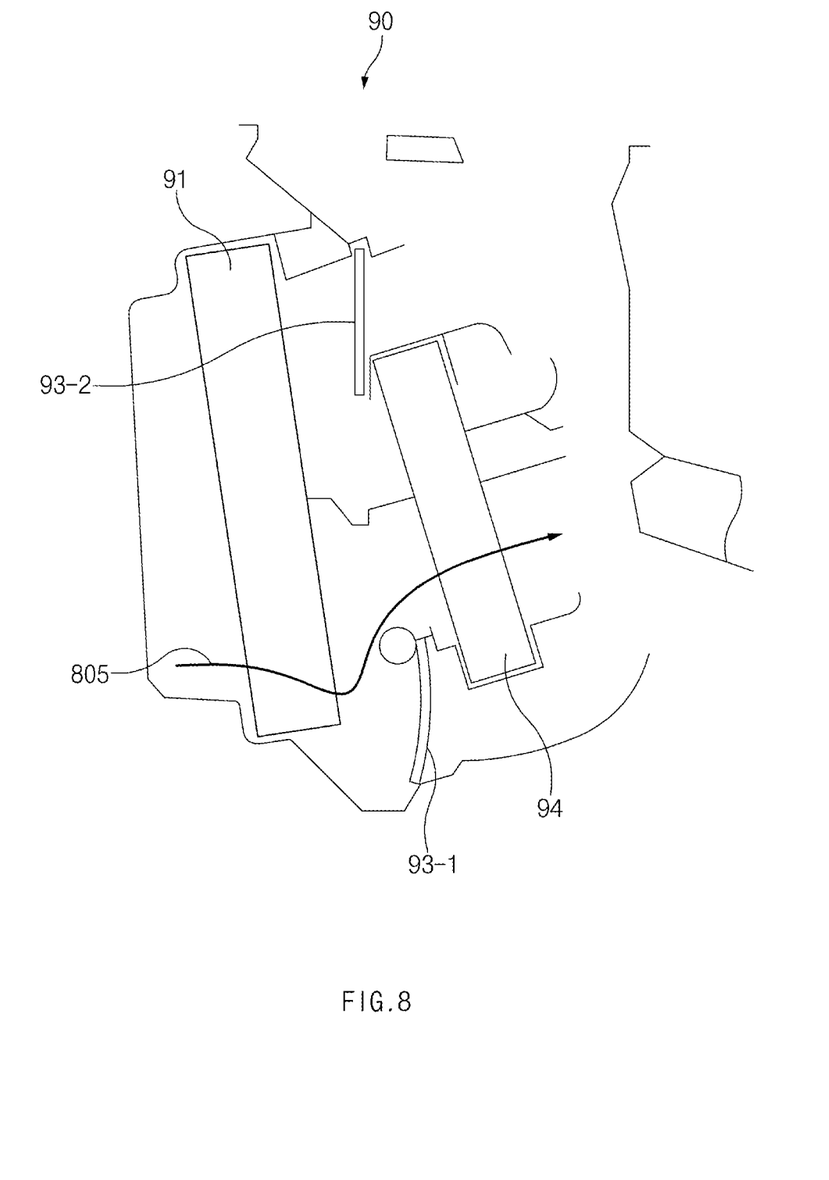
FIG. 8 illustrates a structure of an air conditioning system according to various embodiments.

FIG. 6 is a functional block diagram of a fuel cell system according to various embodiments. FIG. 7 illustrates a cooling degree according to an opening degree of a second valve. FIG. 8 illustrates a structure (e.g., a side section view) of the air conditioning system according to various embodiments. The configuration illustrated in FIG. 6 may be a hardware device or a program (or an application) including instructions.

A controller 610 may be a hardware device, such as a processor or a central processing unit (CPU), or a program implemented by a processor. The controller 610 may be connected to the configurations of the fuel cell system to perform an overall function of the fuel cell system. As an embodiment, the controller 610 may detect a failure of the cooling fan 80. For example, the controller 610 may detect a disabled state of controller area network (CAN) communication between the controller 610 and the cooling fan 80, may detect that a temperature of the first cooling water does not change for a specific period of time, or may detect that power consumption of the cooling fan 80 does not change for a specific period of time. The temperature of the first cooling water may be a temperature of the first cooling water at an inlet of the fuel cell stack 10, which is measured by a first temperature sensor 112. Because air cooling in the first radiator 60 (or the second radiator 70) through compulsory convection is not made when an operation of the cooling fan 80 is disabled, the temperature of the first cooling water heated in the fuel cell stack 10 may not be decreased by a specific temperature. The controller 610 may control the configurations of the fuel cell system to minimize overheating of the fuel cell system in a disabled state of the cooling fan 80. To achieve this, the controller 610 may include a first valve controller 612, a second valve controller 614, a first pump controller 616, a second pump controller 618, and an air conditioning controller 620. The configurations included in the controller may be implemented by individual devices (or programs) or may be implemented by one integrated module.

The first valve controller 612 and the second valve controller 614 may control opening degrees of the first valve 20 and the second valve 40, respectively. In the embodiment, when a failure of the cooling fan 80 is detected, the first valve controller 612 may control the first valve 20 such that the first cooling water does not flow to the first connection line 130 but flows to the fuel cell stack 10 and a heater core 94 of the air conditioning system 90 to secure a cooling degree of the fuel cell system. Furthermore, the second valve controller 614 may control the second valve 40 such that the first cooling water, which has passed through the fuel cell stack 10, does not flow to the third connection line 140 but flows to the first radiator 60 and the heater core 94 of the air conditioning system 90. The first cooling water may be cooled through natural convection while passing through the first radiator 60, and may be cooled through a blower 92 while passing through the heater core 94. In this case, the second valve controller 614 may control the opening degree of the second valve 40 to a specific value in consideration of the cooling degree of the air conditioning system 90 and the cooling degree of the first radiator 80. For example, referring to FIG. 7, a transverse axis of the graph represents an opening angle (or may be referred to as 'an operation angle') (unit: degrees) of the second valve 40, and a longitudinal axis thereof may represent a flow rate (LPM) and a cooling degree (kW). When the opening angle of the second valve 40 exceeds a specific angle (e.g., 80 degrees), a cooling degree (a radiator cooling degree) due to the radiator may increase while a flow rate of the first cooling water, on a side that is close to the radiator (e.g., the first radiator 60), increases, and a cooing degree (an air conditioning system cooling degree) due to the air conditioning system may decrease as a flow rate of the first cooling water, on a side that is close to the air conditioning system (e.g., the air conditioning system 90), decreases, as the opening angle increases. The second valve controller 614 may control the second valve 40 in consideration of an opening angle (e.g., K), at which a total sum of the radiator cooling degree and the air conditioning system cooling degree is maximal.

A first pump controller 612 and a second pump controller 616 may control operations of the first pump 30 and the second pump 205, respectively. For example, when a failure of the cooling fan 80 is detected, a first pump controller 614 may control an RPM of the first pump 30 to a maximum level to secure the flow rate of the first cooling water at a maximum level. When the first cooling water may exchange heat with the second cooling water through the heat exchanger 300, the second pump controller 616 may control an RPM of the second pump 205 to a maximum level to increase a degree of heat exchange.

An air conditioning system controller 620 may control at least one of the configurations 91 to 94 included in the air conditioning system 90 to maximize an amount of heat emitted in the heater core 94 when a failure of the cooling fan 80 is detected. For example, referring to FIG. 8, the air conditioning system 90 may include a heater core 94 that performs a heating function, an evaporator 91 that cooling the air when the air conditioner is switched on, the blower 92 that guides the cooled air such that the air flows toward the heater core 94, and temperature doors 93-1 and 93-2 that interrupt flows of the air that flows to the heater core 94 through opening and closing thereof. The air conditioning system controller 620 may set an RPM of the blower 92 to a maximum level such that cold air generated through the evaporator 91 flows in a specific direction 805 and passes through the heater core 94, and may cause the air that has passed through the evaporator 91 to flow to the heater core 94 by controlling opening and closing of the temperature doors 93-1 and 93-2. For example, in the opened state, the first temperature door 93-1 may be moved downwards, and the second temperature door 93-2 may be moved upwards.

Figure 9:
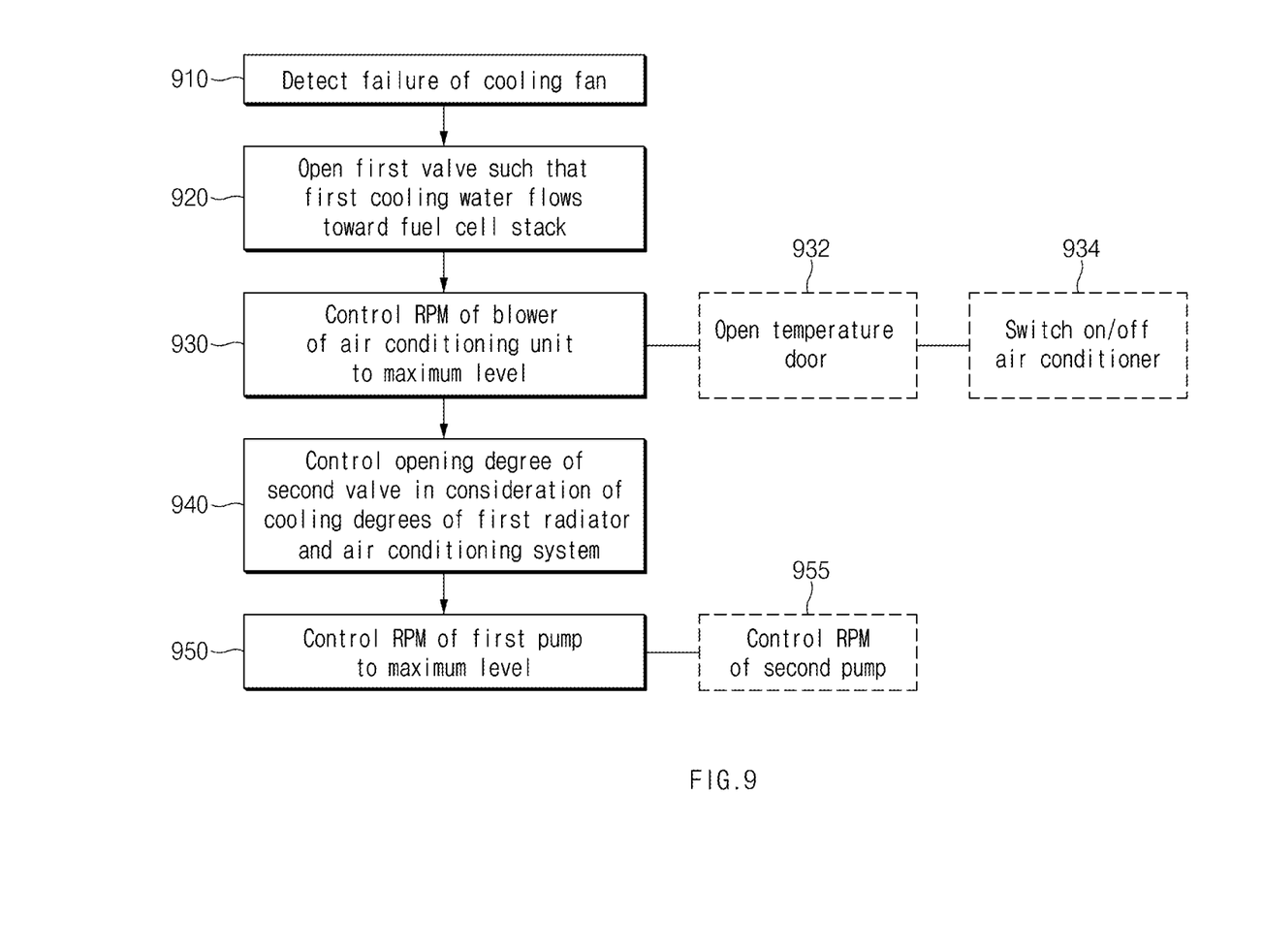
FIG. 9 illustrates a flowchart of operations when a failure of a cooling fan is detected, according to various embodiments.

FIG. 9 illustrates a flowchart of operations when a failure of a cooling fan is detected, according to various embodiments. The operations of the flowchart described hereafter may be implemented by the fuel cell system or may be implemented by the configurations (e.g., the controller 610) included in the fuel cell system.

Referring to FIG. 9, in operation 910, the fuel cell system may detect a failure of the cooling fan 80.

In operation 920, the fuel cell system may open the first valve 20 such that the first cooling water flows toward the fuel cell stack 10.

In operation 930, the fuel cell stack may control (set) the RPM of the blower 92 of the air conditioning system 90 to a maximum valve. Additionally, in operation 930, the fuel cell system may open the temperature doors 93-1 and 93-2 such that the cooled air passes through the heater core 94. Additionally, in operation 934, the fuel cell system may switch on and off the air conditioner based on whether a condenser is include therein. For example, when a condenser is not included in a vehicle cooling module including the first radiator 60, the second radiator 70, and the cooling fan 80, the fuel cell system may control the air conditioner to be switched on to cool the air. Meanwhile, when a condenser is included in the vehicle cooling module, the fuel cell system may control the air conditioner to be switched on and off because the temperature of the first radiator 60 may be increased due to a rise in a temperature of the condenser when the air conditioner is operated.

In operation 940, the fuel cell system may control the opening degree of the second valve 40 in consideration of the cooling degrees of the first radiator 60 and the air conditioning system 90. The fuel cell system may control the opening degree of the second valve 40 such that a total sum of the cooling degree of the first radiator 60 and the cooling degree of the air conditioning system 90 becomes maximal.

In operation 950, the fuel cell stack may control the RPM of the first pump 30 to a maximum valve. When the fuel cell system includes the second radiator 70 as well as the first radiator 60 or the fuel cell system includes the heat exchanger 300, in operation 955, the fuel cell system may control the RPM of the second pump 205 to a maximum level.

Figure 10:
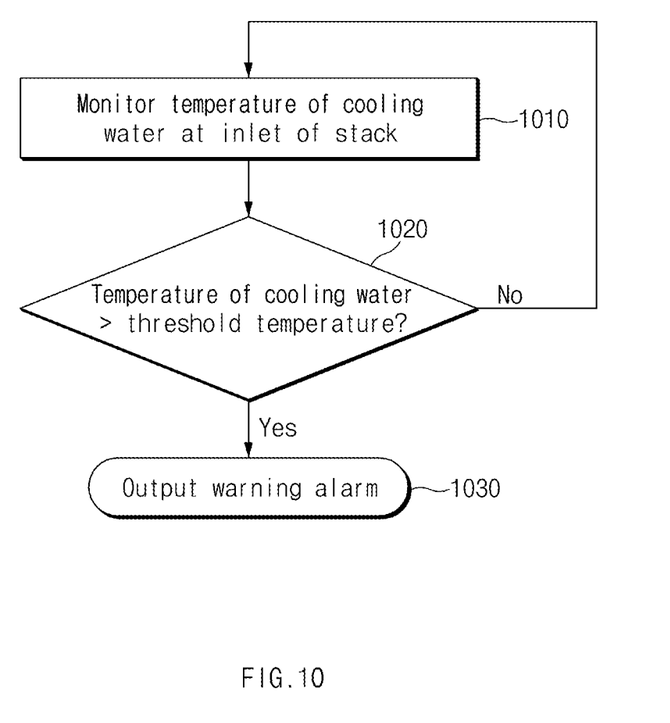
FIG. 10 illustrates a flowchart of an operation of outputting a warning alarm according to various embodiments.

FIG. 10 illustrates a flowchart of an operation of outputting a warning alarm according to various embodiments. The operations illustrated in FIG. 10 may be performed at an arbitrary time point after operation 910 of FIG. 9. For example, the fuel cell system may perform the operations illustrated in FIG. 10, after operation 950 or after operation 910, 920, 930, 932, 934, or 940.

Referring to FIG. 10, in operation 1010, the fuel cell system may monitor a temperature of the first cooling water at the inlet of the fuel cell stack 10. For example, the controller 610 may monitor the temperature of the cooling water through the first temperature sensor 112.

In operation 1020, the fuel cell system may identify whether the monitored temperature of the cooling water exceeds a threshold value. Unless the temperature of the cooling water exceeds the threshold temperature, the fuel cell system may repeatedly perform operations 1010 to 1020.

When the temperature of the cooling water exceeds the threshold temperature, in operation 1030, the fuel cell system may output a warning alarm to secure safety of the vehicle and the driver.

According to the embodiments of the present disclosure, the fuel cell system may protect damage to the fuel cell stack that is a device of a high price due to overheating even when a failure of a component for heat management, such as a cooling fan, is detected.

According to the embodiment of the present disclosure, the fuel cell system may secure an output of a system while a passenger and a vehicle move to a safe site even in an emergency situation, in which a component for heat management, such as a cooling fan, is detected.

In addition, the present disclosure may provide various effects that are directly or indirectly recognized.

What is claimed is:

1. A fuel cell system comprising:
a fuel cell stack;
a first cooling line having first cooling water that passes via the fuel cell stack and circulates therein;
a first radiator disposed on the first cooling line and configured to cool the first cooling water;
an air conditioning system disposed on a first connection line that forms a heating loop with the first cooling line;
a first cooling fan configured to blow exterior air to the first radiator;
a first valve configured to switch a flow path of the first cooling water to the fuel cell stack or a heater;
a second valve configured to switch the flow path of the first cooling water to the fuel cell stack or the first radiator;
a first pump disposed on the first cooling line and configured to pump the first cooling water; and
a controller connected to the first cooling fan, the first valve, the second valve, and the first pump,
wherein the controller is configured to:
detect a failure of the first cooling fan;
open the first valve such that the first cooling water flows toward the fuel cell stack;
control an RPM of a blower of the air conditioning system to a maximum level;
control an opening degree of the second valve according to a cooling degree of the first radiator and a cooling degree of the air conditioning system; and
control an RPM of the first pump to a maximum level.

2. The fuel cell system of claim 1, wherein the controller detects the failure of the first cooling fan by detecting a disabled state of controller area network (CAN) communication, by detecting that a temperature of the first cooling water does not change for a specific period of time, or by detecting that power consumption of the first cooling fan does not change for a specific period of time.

3. The fuel cell system of claim 1, wherein the controller is further configured to:
control a temperature door to an opened state such that cooled air in the air conditioning system flows toward a heater core.

4. The fuel cell system of claim 3, wherein the controller is configured to:
switch on an air conditioner configured to cool air that flows to the heater core.

5. The fuel cell system of claim 3, further comprising:
a condenser,
wherein the controller is configured to:
switch off an air conditioner configured to cool air that flows toward the heater core.

6. The fuel cell system of claim 1, further comprising:
a second cooling line having second cooling water that passes via a power electronic part and circulates therein;
a second radiator disposed on the second cooling line and configured to cool the second cooling water; and
a second pump disposed on the second cooling line and configured to pump the second cooling water,
wherein the controller is configured to:
control an RPM of the second pump to a maximum level.

7. The fuel cell system of claim 6, wherein the first cooling fan is disposed to blow the exterior air around the first radiator and the second radiator.

8. The fuel cell system of claim 6, further comprising:
a second cooling fan configured to blow the exterior air around the second radiator.

9. The fuel cell system of claim 6, further comprising:
a heat exchanger disposed on the first cooling line and the second cooling line, and configured to exchange heat between the first cooling water and the second cooling water.

10. The fuel cell system of claim 1, wherein the controller is configured to:
monitor a temperature of the first cooling water at an inlet of the fuel cell stack; and
output a warning alarm when the temperature of the first cooling water exceeds a threshold temperature.

* * * * *